United States Patent
Suciu et al.

(10) Patent No.: US 10,221,862 B2
(45) Date of Patent: Mar. 5, 2019

(54) INTERCOOLED COOLING AIR TAPPED FROM PLURAL LOCATIONS

(71) Applicant: United Technologies Corporation, Hartford, CT (US)

(72) Inventors: Gabriel L. Suciu, Glastonbury, CT (US); Jesse M. Chandler, South Windsor, CT (US); Joseph Brent Staubach, Colchester, CT (US); Brian D. Merry, Andover, CT (US)

(73) Assignee: United Technologies Corporation, Farmington, CT (US)

( * ) Notice: Subject to any disclaimer, the term of this patent is extended or adjusted under 35 U.S.C. 154(b) by 669 days.

(21) Appl. No.: 14/695,534

(22) Filed: Apr. 24, 2015

(65) Prior Publication Data

US 2016/0312797 A1 Oct. 27, 2016

(51) Int. Cl.
*F01D 25/12* (2006.01)
*F02C 6/08* (2006.01)
(Continued)

(52) U.S. Cl.
CPC ......... *F04D 29/5826* (2013.01); *F01D 25/12* (2013.01); *F02C 3/13* (2013.01);
(Continued)

(58) Field of Classification Search
CPC .. F02C 7/143; F02C 7/185; F02C 6/08; F02C 3/13; F01D 25/12; F05D 2260/211;
(Continued)

(56) References Cited

U.S. PATENT DOCUMENTS 2,692,476 A 10/1954 Schaal et al.
3,878,677 A 4/1975 Colvin
(Continued)

FOREIGN PATENT DOCUMENTS

DE 2852057 6/1979
EP 0447886 9/1991
(Continued)

OTHER PUBLICATIONS

European Search Report for European Application No. 16166724.1 dated Sep. 26, 2016.
European Search Report for European Patent Application No. 16154635.3 dated Jul. 6, 2016.
European Search Report for European Application No. 16166707.6 dated Sep. 26, 2016.
Dornheim, Michael A., Rolls-Royce Trent 1000 to Drive Boeing 787 Accessories From IP Spool, Aviation Week & Space Technology, Mar. 28, 2005, p. 51, Los Angeles, CA.
(Continued)

*Primary Examiner* — Christopher Verdier
(74) *Attorney, Agent, or Firm* — Carlson, Gaskey & Olds, P.C.

(57) ABSTRACT

A gas turbine engine comprises a main compressor section having a high pressure compressor with a downstream most end, and more upstream locations. A turbine section has a high pressure turbine. A first tap taps air from at least one of the more upstream locations in the main compressor section, passes the tapped air through a heat exchanger and then to a cooling compressor. The cooling compressor compresses air downstream of the heat exchanger. A second tap taps air from a location closer to the downstream most end than the location(s) of the first tap. The first and second tap mix together and are delivered into the high pressure turbine. An intercooling system for a gas turbine engine is also disclosed.

15 Claims, 3 Drawing Sheets

(51) Int. Cl.
*F04D 29/58* (2006.01)
*F02C 3/13* (2006.01)
*F02C 7/18* (2006.01)
*F02C 9/18* (2006.01)
*F02C 7/143* (2006.01)

(52) U.S. Cl.
CPC .............. *F02C 6/08* (2013.01); *F02C 7/143* (2013.01); *F02C 7/185* (2013.01); *F02C 9/18* (2013.01); *F04D 29/5833* (2013.01); *F05D 2220/3212* (2013.01); *F05D 2220/3217* (2013.01); *F05D 2220/3219* (2013.01); *F05D 2260/211* (2013.01); *F05D 2260/213* (2013.01); *F05D 2260/606* (2013.01); *F05D 2270/3062* (2013.01); *Y02T 50/675* (2013.01)

(58) Field of Classification Search
CPC ......... F05D 2260/213; F05D 2260/606; F05D 2270/3062; F04D 29/5826; F04D 29/5833
See application file for complete search history.

(56) References Cited

U.S. PATENT DOCUMENTS

| | | |
|---|---|---|
| 4,254,618 A | 3/1981 | Elovic |
| 4,539,945 A | 9/1985 | Bosisio |
| 4,882,902 A | 11/1989 | Reigel et al. |
| 5,056,335 A | 10/1991 | Renninger et al. |
| 5,269,135 A | 12/1993 | Vermejan et al. |
| 5,305,616 A | 4/1994 | Coffinberry |
| 5,392,614 A | 2/1995 | Coffinberry |
| 5,414,992 A | 5/1995 | Glickstein |
| 5,452,573 A | 9/1995 | Glickstein et al. |
| 5,498,126 A | 3/1996 | Pighetti et al. |
| 5,724,806 A | 3/1998 | Horner |
| 5,758,485 A | 6/1998 | Frutschi |
| 5,867,979 A | 2/1999 | Newton et al. |
| 5,918,458 A | 7/1999 | Coffinberry et al. |
| 6,050,079 A | 4/2000 | Durgin et al. |
| 6,065,282 A | 5/2000 | Fukue et al. |
| 6,134,880 A | 10/2000 | Yoshinaka |
| 6,430,931 B1 | 8/2002 | Homer |
| 6,487,863 B1 | 12/2002 | Chen et al. |
| 6,612,114 B1 | 9/2003 | Klingels |
| 6,892,523 B2 | 5/2005 | Fetescu et al. |
| 7,237,386 B2 | 7/2007 | Hoffmann et al. |
| 7,246,484 B2 | 7/2007 | Giffin, III et al. |
| 7,284,377 B2 | 10/2007 | Joshi et al. |
| 7,306,424 B2 | 12/2007 | Romanov et al. |
| 7,334,412 B2 | 2/2008 | Tiemann |
| 7,347,637 B2 | 3/2008 | Kubo et al. |
| 7,500,365 B2 | 3/2009 | Suciu et al. |
| 7,552,591 B2 | 6/2009 | Bart et al. |
| 7,698,884 B2 | 4/2010 | Maguire et al. |
| 7,765,788 B2 | 8/2010 | Schwarz |
| 7,823,389 B2 | 11/2010 | Seitzer et al. |
| 7,882,691 B2 | 2/2011 | Lemmers, Jr. et al. |
| 7,886,520 B2 | 2/2011 | Stretton et al. |
| 8,015,828 B2 | 9/2011 | Moniz et al. |
| 8,037,686 B2 | 10/2011 | Lasker |
| 8,087,249 B2 | 1/2012 | Ottaviano et al. |
| 8,181,443 B2 | 5/2012 | Rago |
| 8,307,662 B2 | 11/2012 | Turco |
| 8,350,398 B2 | 1/2013 | Butt |
| 8,397,487 B2 | 3/2013 | Sennoun et al. |
| 8,402,742 B2 | 3/2013 | Roberge et al. |
| 8,434,997 B2 | 5/2013 | Pinero et al. |
| 8,511,967 B2 | 8/2013 | Suciu et al. |
| 8,522,529 B2 | 9/2013 | Martinou et al. |
| 8,572,982 B2 | 11/2013 | Tiemann |
| 8,602,717 B2 | 12/2013 | Suciu et al. |
| 8,621,871 B2 | 1/2014 | McCune et al. |
| 8,727,703 B2 | 5/2014 | Laurello et al. |
| 8,776,952 B2 | 7/2014 | Schwarz et al. |
| 8,814,502 B2 | 8/2014 | Eleftheriou |
| 8,876,465 B2 | 11/2014 | Stretton |
| 8,961,108 B2 | 2/2015 | Bergman et al. |
| 9,234,481 B2 | 1/2016 | Suciu et al. |
| 9,243,563 B2 | 1/2016 | Lo |
| 9,255,492 B2 | 2/2016 | Bacic |
| 9,297,391 B2 | 3/2016 | Rued et al. |
| 9,422,063 B2 | 8/2016 | Diaz |
| 9,429,072 B2 | 8/2016 | Diaz et al. |
| 2003/0046938 A1 | 3/2003 | Mortzheim et al. |
| 2004/0088995 A1 | 5/2004 | Reissig |
| 2005/0172612 A1 | 8/2005 | Yamanaka et al. |
| 2007/0022735 A1 | 2/2007 | Henry et al. |
| 2007/0213917 A1 | 9/2007 | Bruno et al. |
| 2007/0245738 A1 | 10/2007 | Stretton et al. |
| 2008/0028763 A1 | 2/2008 | Schwarz et al. |
| 2008/0230651 A1 | 9/2008 | Porte |
| 2008/0253881 A1 | 10/2008 | Richards |
| 2009/0007567 A1 | 1/2009 | Porte et al. |
| 2009/0090096 A1 | 4/2009 | Sheridan |
| 2009/0145102 A1 | 6/2009 | Roberge et al. |
| 2009/0196736 A1 | 8/2009 | Sengar et al. |
| 2009/0226297 A1 | 9/2009 | Yanagi et al. |
| 2009/0272120 A1 | 11/2009 | Tiemann |
| 2009/0285680 A1* | 11/2009 | Hess ................... F01D 5/081 416/1 |
| 2010/0043396 A1 | 2/2010 | Coffinberry |
| 2010/0154434 A1 | 6/2010 | Kubota et al. |
| 2011/0036066 A1 | 2/2011 | Zhang et al. |
| 2011/0088405 A1 | 4/2011 | Turco |
| 2011/0120083 A1 | 5/2011 | Giffin et al. |
| 2011/0247344 A1 | 10/2011 | Glahn et al. |
| 2012/0067055 A1 | 3/2012 | Held |
| 2012/0102915 A1 | 5/2012 | Baltas |
| 2012/0159961 A1 | 6/2012 | Krautheim et al. |
| 2012/0180509 A1 | 7/2012 | DeFrancesco |
| 2012/0266613 A1* | 10/2012 | Rodriguez ............... H02K 9/12 62/62 |
| 2013/0036747 A1 | 2/2013 | Fuchs et al. |
| 2013/0067928 A1 | 3/2013 | Arias Chao et al. |
| 2013/0098059 A1 | 4/2013 | Suciu et al. |
| 2013/0145744 A1 | 6/2013 | Lo et al. |
| 2013/0145774 A1 | 6/2013 | Duong et al. |
| 2013/0152602 A1* | 6/2013 | Bacic .................... F02C 6/08 60/782 |
| 2013/0186102 A1 | 7/2013 | Lo |
| 2013/0199156 A1 | 8/2013 | Ress, Jr. et al. |
| 2013/0239583 A1 | 9/2013 | Suciu et al. |
| 2013/0319002 A1 | 12/2013 | Sidelkovskiy et al. |
| 2014/0020506 A1 | 1/2014 | Duong |
| 2014/0137417 A1 | 5/2014 | Silberberg et al. |
| 2014/0196469 A1 | 7/2014 | Finney et al. |
| 2014/0230444 A1 | 8/2014 | Hao et al. |
| 2014/0250898 A1 | 9/2014 | Mackin et al. |
| 2014/0260326 A1 | 9/2014 | Schwarz et al. |
| 2014/0311157 A1 | 10/2014 | Laurello et al. |
| 2014/0341704 A1 | 11/2014 | Fletcher |
| 2014/0352315 A1 | 12/2014 | Diaz |
| 2015/0114611 A1 | 4/2015 | Morris et al. |
| 2015/0285147 A1 | 10/2015 | Phillips et al. |
| 2015/0308339 A1 | 10/2015 | Forcier |
| 2015/0330236 A1 | 11/2015 | Beecroft et al. |
| 2015/0354465 A1 | 12/2015 | Suciu et al. |
| 2015/0354822 A1 | 12/2015 | Suciu et al. |
| 2016/0010554 A1 | 1/2016 | Suciu et al. |
| 2016/0131036 A1 | 5/2016 | Bintz et al. |
| 2016/0131037 A1 | 5/2016 | Spangler et al. |
| 2016/0169118 A1 | 6/2016 | Duong |
| 2016/0215732 A1 | 7/2016 | Malecki |
| 2016/0237906 A1 | 8/2016 | Suciu et al. |
| 2016/0312797 A1 | 10/2016 | Suciu et al. |
| 2016/0341125 A1 | 11/2016 | Kraft et al. |
| 2016/0369697 A1 | 12/2016 | Schwarz et al. |
| 2017/0009657 A1 | 1/2017 | Schwarz et al. |
| 2017/0044980 A1 | 2/2017 | Duesler et al. |
| 2017/0044982 A1 | 2/2017 | Duesler et al. |
| 2017/0152765 A1 | 6/2017 | Uechi et al. |
| 2017/0159568 A1 | 6/2017 | Sennoun et al. |
| 2017/0167388 A1 | 6/2017 | Merry et al. |

(56) References Cited

U.S. PATENT DOCUMENTS

| 2017/0175632 A1 | 6/2017 | Hanrahan et al. |
| 2017/0184027 A1 | 6/2017 | Moniz et al. |
| 2017/0204787 A1 | 7/2017 | Duesler et al. |

FOREIGN PATENT DOCUMENTS

| EP | 0469825 | | 2/1992 |
| EP | 0608142 | A1 | 7/1994 |
| EP | 0903484 | A2 | 3/1999 |
| EP | 1314872 | | 5/2003 |
| EP | 1944475 | | 7/2008 |
| EP | 2085599 | | 8/2009 |
| EP | 2128023 | | 12/2009 |
| EP | 2362081 | | 8/2011 |
| EP | 2540991 | | 1/2013 |
| EP | 2584172 | | 4/2013 |
| EP | 2604825 | A2 | 6/2013 |
| EP | 2733322 | | 5/2014 |
| EP | 2865981 | | 4/2015 |
| EP | 2942490 | | 11/2015 |
| EP | 3085923 | | 10/2016 |
| EP | 3085924 | | 10/2016 |
| EP | 3121411 | | 1/2017 |
| FR | 2851295 | A1 | 8/2004 |
| GB | 1244340 | A | 8/1971 |
| GB | 2152148 | | 7/1985 |
| JP | H1136889 | | 2/1999 |
| WO | 2003037715 | | 5/2003 |
| WO | 2008082335 | | 7/2008 |
| WO | 2013154631 | | 10/2013 |
| WO | 2014046713 | | 3/2014 |
| WO | 2014092777 | A1 | 6/2014 |
| WO | 2014120125 | | 8/2014 |

OTHER PUBLICATIONS

U.S. Appl. No. 15/232,101.
U.S. Appl. No. 14/964,984.
U.S. Appl. No. 14/967,446.
U.S. Appl. No. 15/069,197.
U.S. Appl. No. 15/269,014.
U.S. Appl. No. 15/373,072.
European Search Report for EP Application No. 17160816.9 dated Jul. 21, 2017.
European Search Report for European Application No. 16180657.5 dated Dec. 16, 2016.
European Search Report for European Application No. 16202876.5 dated Apr. 24, 2017.
European Search Report for European Application No. 16155316.9 completed Jun. 30, 2016.
European Search Report for Application No. 16170021.6 dated Oct. 11, 2016.
European Search Report for Application No. 16174862.9 dated Nov. 7, 2016.
European Search Report for European Application No. 16175531.9 dated Nov. 15, 2016.
European Search Report for European Application No. 16175533.5 dated Nov. 15, 2016.
European Search Report for European Application No. 16175552.5 dated Nov. 17, 2016.
European Search Report for European Application No. 16175760.4 dated Nov. 16, 2016.
European Search Report for Application No. 16178207.3 dated Nov. 21, 2016.

* cited by examiner

INTERCOOLED COOLING AIR TAPPED FROM PLURAL LOCATIONS

BACKGROUND

This application relates to improvements in providing cooling air from a compressor section to a turbine section in a gas turbine engine.

Gas turbine engines are known and typically include a fan delivering air into a bypass duct as propulsion air. Further, the fan delivers air into a compressor section where it is compressed. The compressed air passes into a combustion section where it is mixed with fuel and ignited. Products of this combustion pass downstream over turbine rotors driving them to rotate.

It is known to provide cooling air from the compressor to the turbine section to lower the operating temperatures in the turbine section and improve overall engine operation. Typically, air from the downstream most end of the compressor has been tapped, passed through a heat exchanger, which may sit in the bypass duct and then delivered into the turbine section. The air from the downstream most end of the compressor section is at elevated temperatures.

SUMMARY

In a featured embodiment, a gas turbine engine comprises a main compressor section having a high pressure compressor with a downstream most end, and more upstream locations. A turbine section has a high pressure turbine. A first tap taps air from at least one of the more upstream locations in the main compressor section, passes the tapped air through a heat exchanger and then to a cooling compressor. The cooling compressor compresses air downstream of the heat exchanger. A second tap taps air from a location closer to the downstream most end than the location(s) of the first tap. The first and second tap mix together and are delivered into the high pressure turbine.

In another embodiment according to the previous embodiment, a main fan delivers bypass air into a bypass duct and into the main compressor section and the heat exchanger positioned within the bypass duct to be cooled by bypass air.

In another embodiment according to any of the previous embodiments, air temperatures at the downstream most location of the high pressure compressor are greater than or equal to 1350° F.

In another embodiment according to any of the previous embodiments, the second tap is at the downstream most end.

In another embodiment according to any of the previous embodiments, air from the first tap mixes with air from the second tap at a location downstream of the cooling compressor.

In another embodiment according to any of the previous embodiments, air from the first tap mixes with air from the second tap at a location downstream of the cooling compressor.

In another embodiment according to any of the previous embodiments, air from the first and second tap mix together in a mixer.

In another embodiment according to any of the previous embodiments, air in the first and second tap are mixed together before being delivered to the high pressure turbine by a valve.

In another embodiment according to any of the previous embodiments, the valve is controlled based upon an operational power of the engine to mix more of air from the second tap with air from the first tap at lower power operation, and to mix more of air from the first tap, relative to the air from the second tap at higher power operation.

In another embodiment according to any of the previous embodiments, an auxiliary fan is positioned upstream of the heat exchanger.

In another featured embodiment, an intercooling system for a gas turbine engine comprises a heat exchanger for cooling air drawn from a first tap portion of a main compressor section at a first temperature and pressure for cooling the air to a second temperature cooler than the first temperature. A cooling compressor compresses air communicated from the heat exchanger to a second pressure greater than the first pressure. A second tap taps air from a location closer to a downstream most end of the main compressor section than a location of the first tap. Air from the first and second taps mixes together and is delivered into a high pressure turbine.

In another embodiment according to the previous embodiment, an auxiliary fan is positioned upstream of the heat exchanger.

In another embodiment according to any of the previous embodiments, a main fan delivers bypass air into a bypass duct and into the main compressor section. The heat exchanger is positioned within the bypass duct to be cooled by bypass air.

In another embodiment according to any of the previous embodiments, air temperatures at the downstream most location of the main compressor section are greater than or equal to 1350° F.

In another embodiment according to any of the previous embodiments, the second tap is at the downstream most end.

In another embodiment according to any of the previous embodiments, air from the first tap mixes with air from the second tap at a location downstream of the cooling compressor.

In another embodiment according to any of the previous embodiments, air from the first and second tap mix together in a mixer.

In another embodiment according to any of the previous embodiments, air in the first and second tap are mixed together before being delivered to the high pressure turbine by a valve.

In another embodiment according to any of the previous embodiments, the valve is controlled based upon an operational power of an associated engine to mix more of air from the second tap with air from the first tap at lower power operation, and to mix more of air from the first tap, relative to the air from the second tap at higher power operation.

In another embodiment according to any of the previous embodiments, an auxiliary fan is positioned upstream of the heat exchanger.

These and other features may best be understood from the following specification and drawings, the following of which is a brief description.

DETAILED DESCRIPTION

Figure 1:
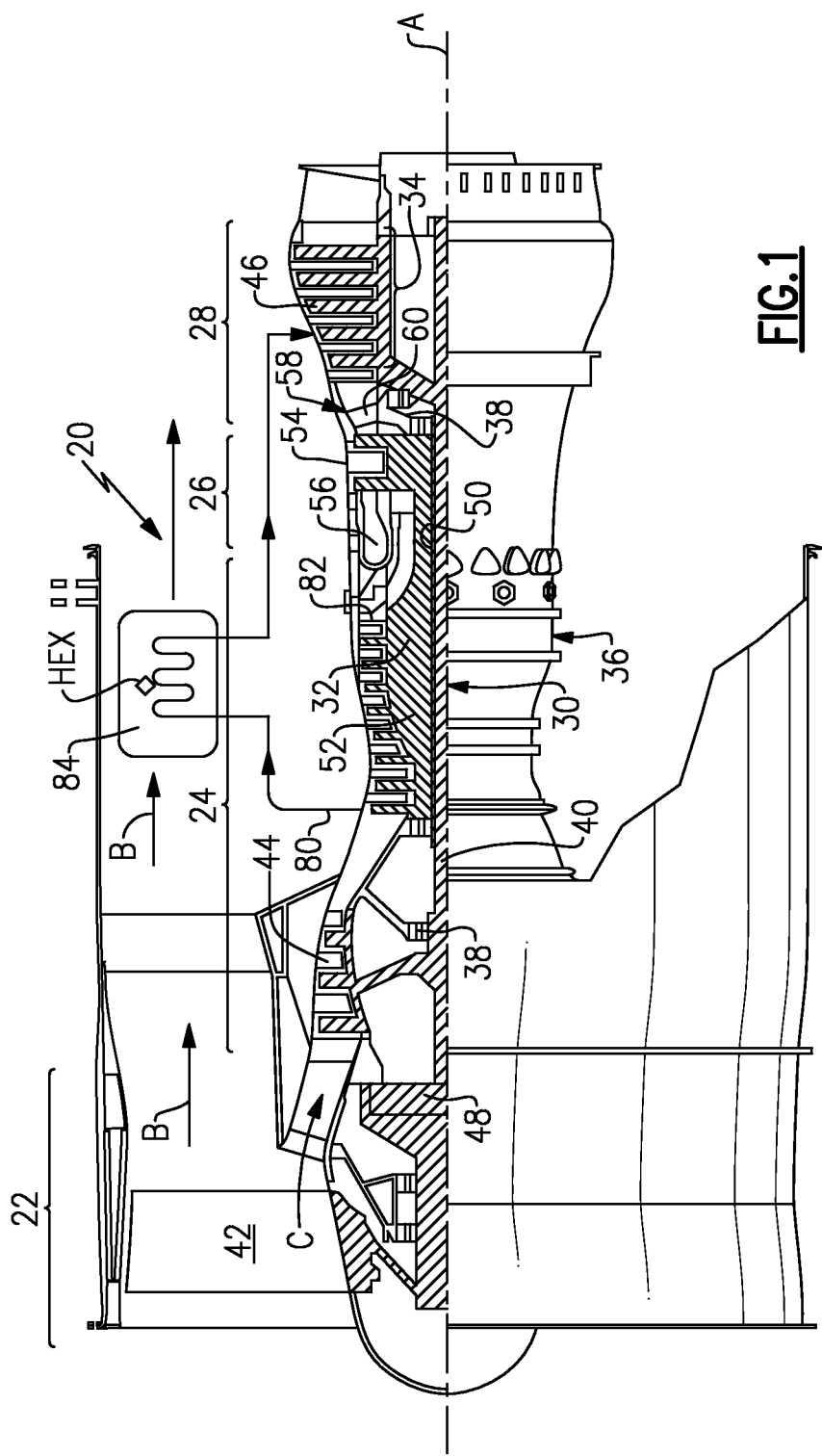
FIG. 1 schematically shows a gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Gas turbine engines designs are seeking to increase overall efficiency by generating higher overall pressure ratios. By achieving higher overall pressure ratios, increased levels of performance and efficiency may be achieved. However, challenges are raised in that the parts and components associated with a high pressure turbine require additional cooling air as the overall pressure ratio increases.

The example engine 20 utilizes air bleed 80 from an upstream portion of the compressor section 24 for use in cooling portions of the turbine section 28. The air bleed is from a location upstream of the downstream end 82 of the compressor section 24. The bleed air passes through a heat exchanger 84 to further cool the cooling air provided to the turbine section 28. The air passing through heat exchanger 84 is cooled by the bypass air B. That is, heat exchanger 84 is positioned in the path of bypass air B.

Figure 2:
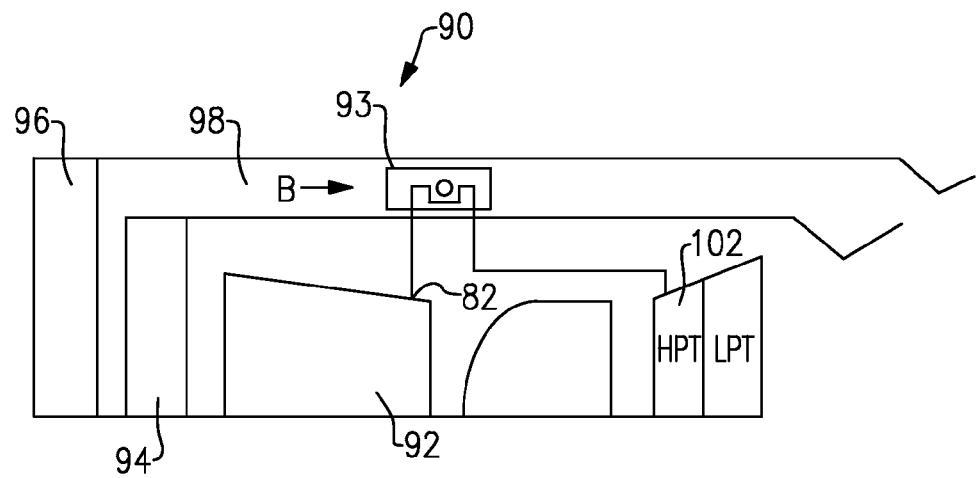
FIG. 2 shows a prior art engine.

A prior art approach to providing cooling air is illustrated in FIG. 2. An engine 90 incorporates a high pressure compressor 92 downstream of the low pressure compressor 94. As known, a fan 96 delivers air into a bypass duct 98 and into the low pressure compressor 94. A downstream most point 82 in the high pressure compressor 92 provides bleed air into a heat exchanger 93. The heat exchanger is in the path of the bypass air in bypass duct 98, and is cooled. This high pressure high temperature air from location 82 is delivered into a high pressure turbine 102.

The downstream most point 82 of the high pressure compressor 92 is known as station 3. The temperature T3 and pressure P3 are both very high.

In future engines, T3 levels are expected to approach greater than or equal to 1350° F. Current heat exchanger technology is becoming a limiting factor as they are made of materials, manufacturing, and design capability which have difficulty receiving such high temperature levels.

Figure 3:
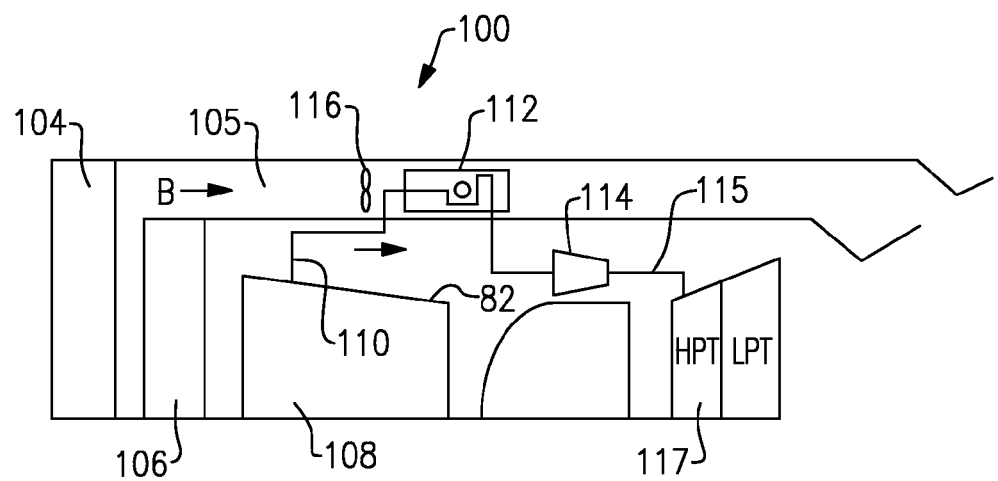
FIG. 3 shows one example engine.

FIG. 3 shows an engine 100 coming within the scope of this disclosure. A fan 104 may deliver air B into a bypass duct 105 and into a low pressure compressor 106. High pressure compressor 108 is positioned downstream of the low pressure compressor 106. A bleed 110 taps air from a location upstream of the downstream most end 82 of the high pressure compressor 108. This air is at temperatures and pressures which are much lower than T3/P3. The air tapped at 110 passes through a heat exchanger 112 which sits in the bypass duct 105 receiving air B. Further, the air from the heat exchanger 112 passes through a compressor 114, and then into a conduit 115 leading to a high turbine 117. This structure is all shown schematically.

Since the air tapped at point 110 is at much lower pressures and temperatures than the FIG. 2 prior art, currently available heat exchanger materials and technology may be utilized. This air is then compressed by compressor 114 to a higher pressure level such that it will be able to flow into the high pressure turbine 117.

An auxiliary fan 116 is illustrated upstream of the heat exchanger 112. The main fan 104 may not provide sufficient pressure to drive sufficient air across the heat exchanger 112. The auxiliary fan will ensure there is adequate air flow in the circumferential location of the heat exchanger 112.

In one embodiment, the auxiliary fan may be variable speed, with the speed of the fan varied to control the temperature of the air downstream of the heat exchanger 112. As an example, the speed of the auxiliary fan may be varied based upon the operating power of the overall engine.

Details of the basic system are disclosed in co-pending U.S. patent application Ser. No. 14/695,578, entitled "Intercooled Cooling Air," and filed on even date herewith, which application is hereby incorporated in its entirety by reference.

Details of an improved heat exchanger are disclosed in U.S. patent application Ser. No. 14/695,504, now U.S. Pat. No. 9,850,819, entitled "Intercooled Cooling Air With Dual Pass Heat Exchanger," and filed on even date herewith, which application is hereby incorporated in its entirety by reference.

Figure 4:
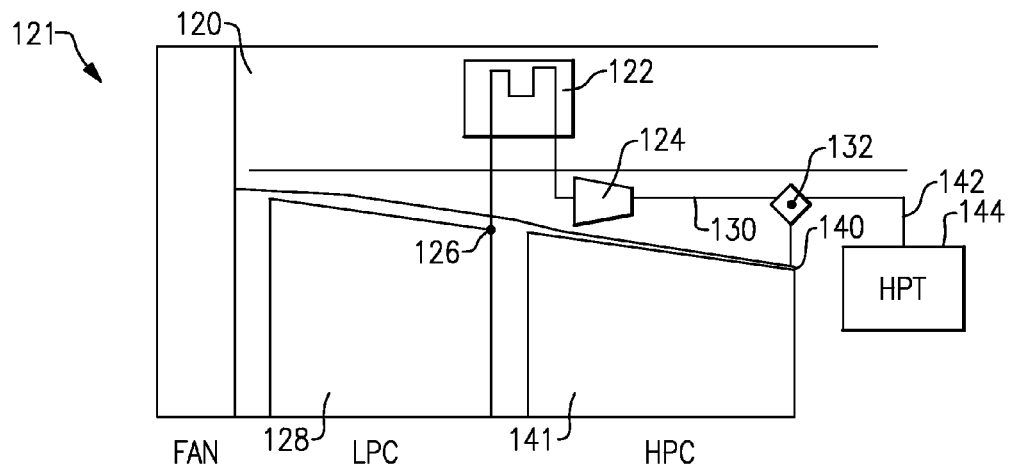
FIG. 4 shows an example system.

FIG. 4 shows an engine 121 that provides a variation to the basic system disclosed above. A bypass duct 120 again receives a heat exchanger 122, which communicates with the compressor 124. Air is tapped from the low pressure compressor 128 at a location 126 and passes through the heat exchanger 122. A line 130 downstream of the compressor communicates with a mixer 132. Air is tapped at 140 from the most downstream location in a high pressure compressor 141. While the most downstream location is disclosed, it is possible to use an alternative location that is closer to the most downstream end than the location 126. The air is mixed with the cooler air from line 130 in the mixer 132 and then passes into a line 142 to be delivered to the high pressure turbine 144.

With this arrangement, the amount of cooled air tapped from the low pressure compressor 128 is reduced, and therefore the size of the compressor 124 can be reduced.

Figure 5:
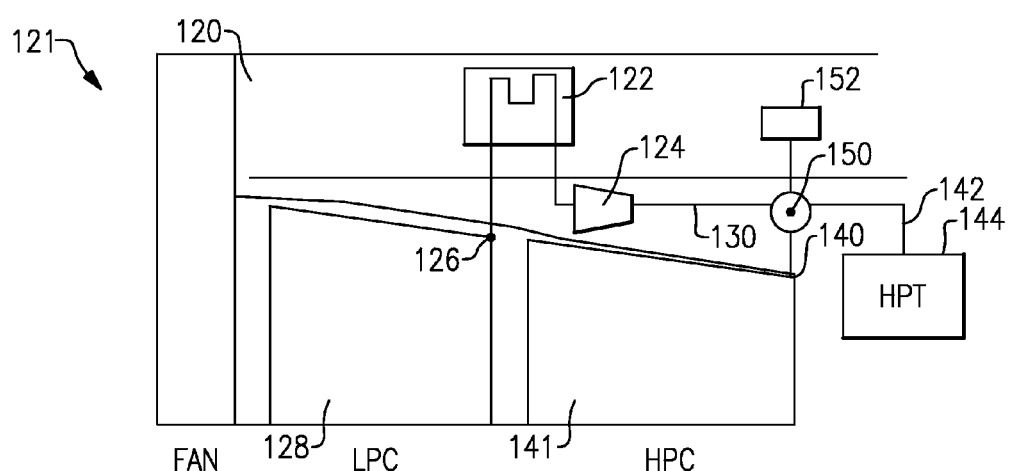
FIG. 5 shows a second example system.

FIG. 5 shows yet another embodiment wherein the mixer 132 is replaced by a valve 150 which is operable to vary the volume of air from tap 140 and the line 130 being delivered into the line 142. Thus, at certain periods of operation, a control 152 for the valve 150 may mix more or less of the hot air from tap 140 relative to the cooler air. As an example, at lower power operation, such as cruise, more of the hot air may be mixed with the cool air. On the other hand, at high power operation, such as take-off, the percentage of cooler air from line 130 will be greater relative to the hot air from tap 140.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
    a main compressor section having a high pressure compressor with a downstream most end, and more upstream locations;
    a turbine section having a high pressure turbine;
    a first tap tapping air from at least one of said more upstream locations in said main compressor section, passing said tapped air through a heat exchanger and then to a cooling compressor, said cooling compressor compressing air downstream of said heat exchanger;
    a second tap tapping air from a location closer to said downstream most end than the location of said first tap, and air from said first and second tap mixing together and being delivered into said high pressure turbine;
    wherein air in said first and second tap are mixed together before being delivered to said high pressure turbine by a valve; and
    wherein said valve being controlled based upon an operational power of the engine to mix more of air from said second tap with air from said first tap at lower power operation, and to mix more of air from said first tap, relative to the air from said second tap at higher power operation.

2. The gas turbine engine as set forth in claim 1, wherein a main fan delivers bypass air into a bypass duct and into said main compressor section and said heat exchanger positioned within said bypass duct to be cooled by bypass air.

3. The gas turbine engine as set forth in claim 1, wherein the second tap is at said downstream most end.

4. The gas turbine engine as set forth in claim 3, wherein air from said first tap mixes with air from said second tap at a location downstream of said cooling compressor.

5. The gas turbine engine as set forth in claim 1, wherein air from said first tap mixes with air from said second tap at a location downstream of said cooling compressor.

6. The gas turbine engine as set forth in claim 1, wherein air from said first and second tap mix together in a mixer.

7. The gas turbine engine as set forth in claim 1, wherein an auxiliary fan is positioned upstream of the heat exchanger.

8. The gas turbine engine as set forth in claim 2, wherein air from said first tap mixes with air from said second tap at a location downstream of said cooling compressor.

9. An intercooling system for a gas turbine engine comprising:
- a heat exchanger for cooling air drawn from a first tap portion of a main compressor section at a first temperature and pressure for cooling the air to a second temperature cooler than the first temperature;
- a cooling compressor compressing air communicated from the heat exchanger to a second pressure greater than the first pressure;
- a second tap tapping air from a location closer to a downstream most end of said main compressor section than a location of said first tap, and air from said first and second taps mixing together and being delivered into a high pressure turbine;
- wherein said air from said first tap mixes with said air from said second tap at a location downstream of said cooling compressor;
- wherein air in said first and second tap are mixed together before being delivered to said high pressure turbine by a valve; and
- wherein said valve being controlled based upon an operational power of the engine to mix more of air from said second tap with air from said first tap at lower power operation, and to mix more of air from said first tap, relative to the air from said second tap at higher power operation.

10. The intercooling system as set forth in claim 9, wherein an auxiliary fan is positioned upstream of the heat exchanger.

11. The intercooling system as set forth in claim 9, wherein a main fan delivers bypass air into a bypass duct and into said main compressor section and said heat exchanger positioned within said bypass duct to be cooled by bypass air.

12. The intercooling system as set forth in claim 9, wherein air temperatures at the downstream most location of said main compressor section are greater than or equal to 1350° F.

13. The intercooling system as set forth in claim 9, wherein the second tap is at said downstream most end.

14. The intercooling system as set forth in claim 9, wherein air from said first and second tap mix together in a mixer.

15. The intercooling system as set forth in claim 14, wherein an auxiliary fan is positioned upstream of the heat exchanger.

* * * * *